United States Patent
Gutierrez et al.

(10) Patent No.: US 6,517,718 B2
(45) Date of Patent: Feb. 11, 2003

(54) FLUID FILTER FOR VEHICLE SOLENOID VALVE

(75) Inventors: Roberto Gutierrez, El Paso, TX (US); Samuel S Newcomer, El Paso, TX (US); Duane Zedric Collins, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/900,805

(22) Filed: Jul. 6, 2001

(65) Prior Publication Data

US 2003/0006182 A1 Jan. 9, 2003

(51) Int. Cl.[7] ................. B01D 29/13; B01D 29/15; B01D 35/02; F16K 51/00; F02M 37/22
(52) U.S. Cl. ................. 210/232; 210/430; 210/495; 264/249; 264/DIG. 48
(58) Field of Search ................. 210/232, 430, 210/495; 264/249, DIG. 48

(56) References Cited

U.S. PATENT DOCUMENTS

| | | | | |
|---|---|---|---|---|
| 3,561,604 | A | * | 2/1971 | Yotsumoto |
| 5,238,192 | A | * | 8/1993 | McNair |
| 5,482,622 | A | * | 1/1996 | Stark et al. |
| 5,807,483 | A | * | 9/1998 | Cassidy et al. |

FOREIGN PATENT DOCUMENTS

| | | | |
|---|---|---|---|
| JP | 03-237260 | * | 10/1991 |
| JP | 2000-266235 | * | 9/2000 |

* cited by examiner

*Primary Examiner*—Thomas M. Lithgow
(74) *Attorney, Agent, or Firm*—Margaret A. Dobrowitsky

(57) ABSTRACT

A fluid filter for a vehicle solenoid valve includes a male end piece, a female end piece, and a medial end piece therebetween. A first screen connects the male end piece to the central support piece and a second screen connects the female end piece to the central support piece. The female end piece is formed with a hole. A post extends from the male end piece. When the filter is wrapped around a solenoid valve, the hole engages the post and is heat staked to hold the filter snugly around the valve with the screens covering the valve ports.

6 Claims, 1 Drawing Sheet

US 6,517,718 B2

FLUID FILTER FOR VEHICLE SOLENOID VALVE

TECHNICAL FIELD

The present invention relates generally to fluid filters for solenoid valves.

BACKGROUND OF THE INVENTION

Modern motor vehicles are equipped with numerous fluid based systems that help enhance the safety and quality of the vehicle operation. Many of these systems include solenoid valves that control the flow of fluid through the different components of the system. In order to prevent particles in the fluid from damaging the solenoid valves and any components downstream from the solenoid valves, a filter is used to prevent these particles from entering, and subsequently exiting, the solenoid valves.

Some solenoid valves require filters that must fit into complex geometric configurations. Flexible filters can be used in conjunction with many of these complex geometric configurations. However, when such filters are, e.g., wrapped around a solenoid valve, it is extremely difficult to effectively join the ends of the filters. Ultrasonic welding has been used, but verifying a good weld typically requires destructive testing. This destructive testing makes using ultra-sonic welding undesirable in conjunction with solenoid valves.

The present invention has recognized these prior art drawbacks, and has provided the below-disclosed solutions to one or more of the prior art deficiencies.

SUMMARY OF THE INVENTION

A fluid filter includes a male end piece, a female end piece, and a central support piece therebetween. A post extends from the male end piece, and the female end piece is formed with a hole that is sized and shaped to receive the post.

A first screen connects the male end piece to the central support piece, and a second screen connects the female end piece to the central support piece. When the filter is wrapped around an object, the post engages the hole to hold the filter against the object. The post is heat staked in the hole.

In a preferred embodiment, the filter is wrapped around a generally cylindrical solenoid valve that has a fluid port exiting radially therefrom. The filter is position such that it covers the fluid port. Preferably, the male end piece, the female end piece, and the central support piece are curved to match the radius of curvature of the solenoid valve. Moreover, the male end piece is formed with a rib and the central support piece is also formed with a rib. The solenoid valve is formed with notches that are sized and shaped to receive the ribs.

In another aspect of the present invention, a fluid filter includes a male end piece that is connected to a female end piece by a screen. A post extends from the male end piece. The female end piece forms a hole that is sized and shaped to receive the post. When the filter is wrapped around an object, the post engages the hole.

In yet another aspect of the present invention, a fluid filter includes a male end piece that is connected to a female end piece by a screen. This aspect of the present invention also includes means for allowing the female end piece to be heat staked to the male end piece after the filter is wrapped around a cylindrical fluid connection.

The present invention will now be described, by way of example, with reference to the accompanying drawings, in which:

DESCRIPTION OF AN EMBODIMENT OF THE INVENTION

Figure 1:
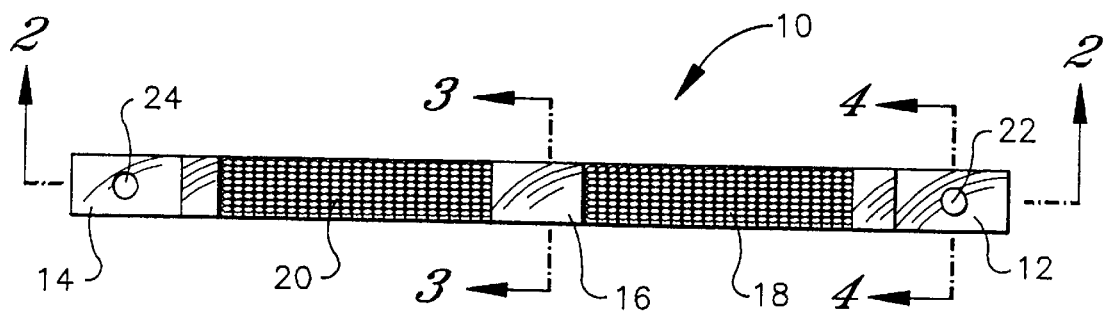
FIG. 1 is top plan view of a fluid filter for vehicle solenoid valve.
Figure 2:
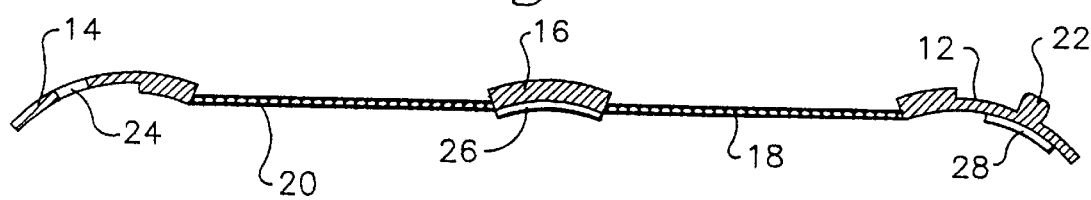
FIG. 2 is a cross-section view of the fluid filter taken along line 2—2 in FIG. 1.

Referring initially to FIGS. 1 and 2, a fluid filter for a vehicle solenoid valve is shown and generally designated 10. FIGS. 1 and 2 show that the filter 10 includes a male end piece 12, a female end piece 14 and a central support piece 16 therebetween. As shown in FIGS. 1 and 2, a first screen 18 connects the male end piece 12 to the central support piece 16. A second screen 20 connects the female end piece 14 to the central support piece 16.

FIGS. 1 and 2 further show that the male end piece 12 includes a post 22 extending perpendicularly therefrom. On the other hand, the female end piece 14 is formed with a hole 24 that is sized and shaped to closely receive the post 22 when the filter 10 is wrapped around a solenoid valve as described below. In a preferred embodiment, the screens 18, 20 are flexible, metallic mesh screens. Preferably, the end pieces 12, 14 and the central support piece 16 are plastic and are molded to the screens 18, 20. It is to be appreciated that a single screen can be used to connect the male end piece 12 to the female end piece 14 and then, the central support piece 16 can be molded onto the screen near its midpoint. Moreover, it is to be appreciated that the central support piece 16 can be omitted from the filter 10. It is preferably includes, however, to provide support to the filter in 10 when it is engaged with a solenoid valve, as described below.

Referring to FIG. 2, it is shown that the male end piece 12, the female end piece 14, and the central support piece 16 are curved to match the radius of curvature of a cylindrical fluid container, e.g. the solenoid valve described below, around which the filter 10 can be wrapped. It is to be appreciated that the radius of curvature of these pieces 12, 14, 16 can be established to match cylinders of various sizes.

Figure 3:
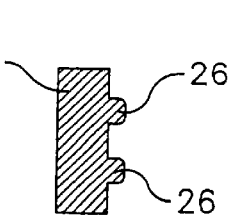
FIG. 3 is a cross-section view of the fluid filter taken along line 3—3 in FIG. 1.
Figure 4:
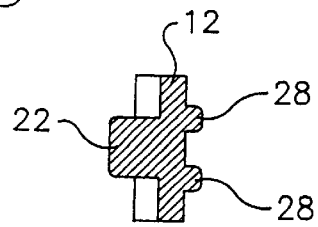
FIG. 4 is a cross-section view of the fluid filter taken along line 4—4 in FIG. 1.

FIGS. 2 and 3 show that the central support piece 16 is formed with a pair of ribs 26. FIGS. 2 and 4 show that the male end piece 12 is also formed with a pair of ribs 28. As described in detail below, the ribs 26, 28 fit into correspondingly sized and shaped notches formed in the solenoid valve described below. The ribs 26, 28 fit into the notches to minimize the likelihood that the filter 10 will slip out of position around the solenoid valve. It is to be appreciated that the two ribs 26 shown in the central support piece 16 and the two ribs 28 shown on the male end piece 12 are the presently preferred configuration and that a single rib may be used in lieu thereof.

Figure 5:
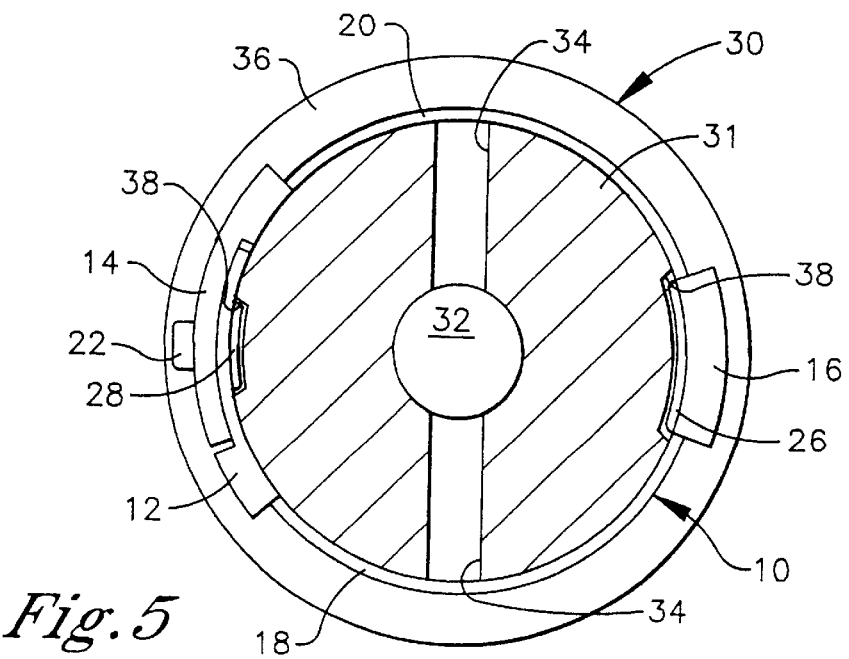
FIG. 5 is an overhead plan view of the fluid filter installed around a solenoid valve.

Referring now to FIG. 5, a generally cylindrical solenoid valve is shown and generally designated 30. FIG. 5 shows that the solenoid valve 30 includes a valve body 31 that is formed with a central fluid passageway 32 and a pair of fluid ports 34 extending radially therefrom. In a preferred embodiment, the solenoid valve 30 is formed with a circumferential groove 36 around the outer periphery of the valve body 31. It is to be understood that the groove 36 is aligned with the exit location of the fluid ports 34. FIG. 5 also shows that the valve body 31 is formed with a pair of notches 38 within the circumferential groove 36.

As shown in FIG. 5, the filter 10 is wrapped around the valve body 31 within the groove 36 so that the screens 18, 20 cover the fluid ports 34. FIG. 5 shows that the filter 10 is wrapped around the solenoid valve 30 so that the female end piece 14 overlaps the male end piece 12 and the post 22 engages the hole 24. The post 12 is then heat staked so that it Amushrooms@ over the hole 24 to hold the female end piece 14 firmly in place over the male end piece 12. As shown in FIG. 5, the ribs 26, 28 extending from the male end piece 12 and the central support piece 16 engage the notches 38 to maintain the position of the filter 10 within the groove 36.

With the configuration of structure described above, it is to be appreciated that the fluid filter 10 provides a means for preventing fluid-borne particles from entering or exiting the solenoid valve 30. The post/hole configuration provides a means by which the integrity of the connection of the ends 12, 14 of the filter 10 can easily be verified visually. It is also to be appreciated that the solenoid valve 30 is but one example of a cylindrical fluid connection around which the fluid filter 10 can be installed. The fluid filter 10 can be used in conjunction with any cylindrical object having a fluid port extending radially therefrom.

While the particular FLUID FILTER FOR A VEHICLE SOLENOID VALVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A fluid filter, comprising:
   a male end piece having a post extending therefrom, the mail end piece forming at least one rib;
   a female end piece having a hole sized and shaped to receive the post;
   a central support piece between the male end piece and the female end piece, the central support piece forming at least one rib;
   a first screen connecting the male end piece to the central support piece; and
   a second screen connecting the female end piece to the central support piece, the post engaging the hole when the filter is wrapped around a generally cylindrical solenoid valve to hold the filter against the solenoid valve, the post being heat staked in the hole, the solenoid valve having at least one fluid port exiting radially therefrom, the male end piece, the female end piece, and the central support piece being curved to match the radius of curvature of the solenoid valve.

2. The filter of claim 1, wherein the solenoid valve is formed with notches sized and shaped to receive the ribs.

3. A fluid filter, comprising:
   a male end piece having a post extending therefrom and said male end piece forming at least one rib;
   a female end piece having a hole sized and shaped to receive the post;
   a central support piece positioned between the post and hole, a first screen portion and a second screen portion being defined on opposite ends of the central support piece and said central support piece forming at least one rib; and
   a screen connecting the male end piece to the female end piece such that when the filter is wrapped around a solenoid valve the post engages the hole, the solenoid valve having at least one fluid port, the filter at least partially covering the fluid port, the male end piece, the female end piece, and the central support piece being shaped to match the outer periphery of the solenoid valve.

4. The filter of claim 3, wherein the solenoid valve is formed with notches sized and shaped to receive the ribs.

5. A fluid filter for a solenoid valve having at least one fluid port and defining an outer periphery, comprising:
   a male end piece, the male end piece being shaped to match the outer periphery of the solenoid valve, the male end piece including means for preventing the filter from moving with respect to the solenoid valve;
   a female end piece, the female end piece being shaped to match the outer periphery of the solenoid valve;
   a central support piece positioned between the male end piece and the female end piece, a first screen portion and a second screen portion being defined on opposite ends of the central support piece, the central support piece being shaped to match the outer periphery of the solenoid valve, the central support piece including means for preventing the filter from moving with respect to the solenoid valve;
   a screen connecting the male end piece to the female end piece; and
   means for allowing the female end piece to be heat staked to the male end piece after the filter is wrapped around the solenoid valve, the filter being positioned such that the screen at least partially covers the fluid port.

6. The filter of claim 5, wherein the solenoid valve include means for preventing the filter from moving with respect to the solenoid valve.

* * * * *